July 12, 1960  J. W. BLACK  2,944,280
CASTER SWIVEL CONSTRUCTION
Filed Aug. 15, 1957
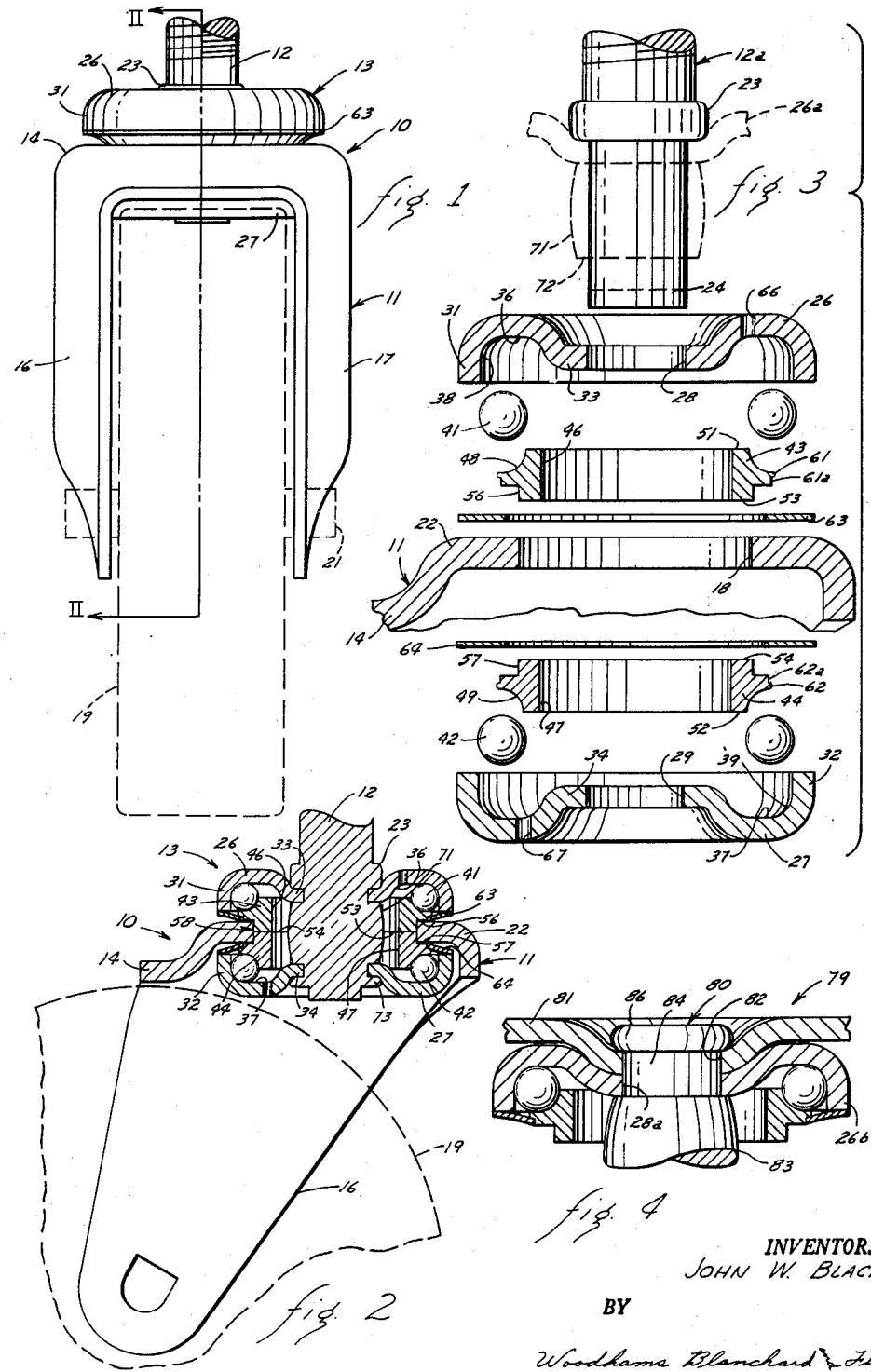
INVENTOR.
JOHN W. BLACK
BY
Woodhams Blanchard & Flynn
ATTORNEYS United States Patent Office 2,944,280
Patented July 12, 1960

2,944,280

CASTER SWIVEL CONSTRUCTION

John W. Black, Kalamazoo Township, Kalamazoo County, Mich., assignor to Pemco Wheel Company, Kalamazoo, Mich., a corporation of Michigan Filed Aug. 15, 1957, Ser. No. 678,287

5 Claims. (Cl. 16—21)

This invention relates in general to swivel caster construction and, more particularly, to an improved bearing structure therefor.

It is well known that, in order to obtain the castering action in a swivel caster, it is necessary that the axis of the caster wheel be spaced a substantial distance sidewardly from the swivel axis of the caster. Accordingly, when a load is placed on a swivel caster, there is created in the swivel mechanism a bending moment which imposes a very substantial strain upon such swivel mechanism. Ordinarily, the capacity of the swivel caster to support a load is limited in large part by the ability of the swivel bearing mechanism to withstand the bending or twisting forces thus imposed thereon.

Because of the above mentioned bending moment, the bearing surfaces in the swivel mechanism on the wheel side of the swivel axis are often subjected to large, and often highly concentrated pressures, even when a relatively light load is being supported by the swivel caster. In fact, failure of a swivel caster often occurs first in some part of the bearing structure thereof. Thus, in order to improve the efficiency, and increase the load capacity, of a swivel caster, it is essential that first effort be directed toward the bearing structure. This can be accomplished, for example, by increasing the distance between the swivel axis and the bearing surfaces, or by increasing the accuracy of the bearing structure in the swivel mechanism, in order to reduce the effect of the bending moment and to provide a greater support surface in any given part of the swivel mechanism. Further, in order to provide maximum wear characteristics and to secure closest possible tolerances in the bearing structures, it is usually necessary to harden the parts providing the bearing surfaces. On the other hand, in order to keep costs to a minimum, it is essential that the swivel mechanism be so constructed that the parts requiring such hardening are held to a minimum, both in number and size.

Another problem arises with respect to the dust and dirt which are frequently found on the floor where casters are normally used. If such dust and dirt get into the bearing structure in the swivel mechanism, it can quickly reduce the efficiency of the caster and it may permanently damage the bearing surfaces therein. As a result, the load capacity of the caster may be substantially and permanently reduced.

It has also been found that, under certain severe conditions of use, it often becomes necessary to clean the caster, as by means of steam or other solvents. Thus, unless the swivel mechanism is within a sealed compartment, the cleaning fluid will also remove the lubricant, which must then be replaced. On the other hand, a seal capable of keeping cleaning fluids out of the swivel bearing will also serve to retain the grease or other lubricant during normal operation of the caster. Thus, it is highly desirable that the bearing structure of the swivel mechanism be housed in a sealed compartment, and thereby insure ease of operation over long periods of use without servicing the swivel mechanism.

A swivel caster structure, which is generally of this type and meets some of the objects of this invention, is disclosed in my co-pending application, Serial No. 635,001, filed January 18, 1957, and entitled "Swivel Caster Structure and Method of Assembling Same." The invention disclosed herein constitutes in both its basic organization and in its details a substantial improvement over existing structures, including that disclosed in Serial No. 635,001.

Accordingly, a primary object of this invention is the provision of a swivel caster having a bearing mechanism whereby said caster can support greater loads with greater efficiency than is presently possible with existing swivel caster bearing mechanisms of corresponding sizes and designed for corresponding purposes.

A further object of this invention is the provision of a swivel caster having a sealed compartment for the swivel bearing mechanism whereby the swivel bearing lubricant is retained and dirt is kept out, thereby insuring long, easy and service free operation.

A further object of this invention is the provision of a mechanism including a flexible and resilient sealing element wherein such element may be easily replaced as needed to keep the swivel mechanism in good operating condition.

A further object of this invention is the provision of a swivel caster bearing mechanism, as aforesaid, which has a double bearing structure disposed within a sealed compartment, which is constructed with a minimum number of parts requiring hardening, which is fabricated with a maximum of accuracy and a minimum of tolerances by comparison with existing structures of this general type, and which has its bearing surfaces disposed at a maximum distance from the swivel axis commensurate with structural limitations imposed by the overall caster structure.

A further object of this invention is the provision of a double bearing structure, as aforesaid, wherein the inner races of each bearing can be formed rapidly and accurately, as by forging, and disposed snugly against each other, so that an extremely accurate control can be exercised over the spacing between the bearing ball raceways in the two inner races.

A further object of the invention is to provide a swivel structure, as aforesaid, which can be assembled from a minimum number of different kinds of parts and which can be further built in a plurality of specific sizes and designs of caster structures with a minimum number of different parts being required.

A further object of the invention is to provide a swivel structure, as aforesaid, which can be readily converted from a dustproof and grease retaining structure into a nondustproof structure, and vice versa, with a minimum of effort and/or expense.

A further object of this invention is the provision of a sealed swivel mechanism, as aforesaid, which can be fabricated without any welding operations whatever.

A further object of this invention is the provision of a sealed swivel mechanism, as aforesaid, which is inexpensive to fabricate by comparison with existing swivel mechanisms for the same or similar purposes, which is foolproof in operation and which requires little or no maintenance.

Other objects and purposes of this invention will become apparent to persons familiar with this type of device upon reading the following specification and examining the accompanying drawings, in which:

Figure 1 is a front elevational view of a swivel caster structure embodying the invention.

Figure 2 is a sectional view taken along the line II—II of Figure 1.

Figure 3 is a broken, enlarged and exploded view of the structure shown in Figure 2.

Figure 4 is an enlarged fragment of Figure 2 showing a modified structure.

For the purpose of convenience in description, the term "upper," "lower" and derivatives thereof, as used herein, will have reference to the caster structure and the parts thereof in their normal position of use, which is shown in Figures 1 and 2. The terms "inner," "outer" and derivatives thereof will have reference to the geometric center of the swivel mechanism characterizing the invention and parts of the caster associated therewith.

General description

In order to meet the objects of this invention, including those mentioned above, I have provided a novel swivel caster structure comprised of a swivel pin which is rotatably connected to the wheel support frame of the caster by means of a swivel assembly including a pair of bearing structures. The bearing structures comprising the invention include a pair of inner thrust rings engaging each other and also gripping the wheel support frame between each other. Bearing races are provided on the mutually remote sides of said thrust rings. A pair of ball retainers, which are positioned, respectively, above and below said thrust rings, are separated therefrom by the bearing balls and are fastened rigidly to the swivel pin. Combined dust and grease seals may extend from the outer periphery of the ball retainers to said thrust rings for enclosing the respective sets of bearing balls and thereby materially inhibiting, or largely preventing, the entry of dust and dirt into the region adjacent to said balls, and at the same time retain grease even during steam-cleaning operations.

Detailed description

As shown in Figures 1 and 2, the swivel caster 10 includes a wheel supporting frame 11, which is connected to a swivel pin 12 by means of the swivel assembly 13. The wheel support frame 11 is comprised of a mounting plate 14 having a pair of integral and parallel flanges 16 and 17, which extend downwardly from opposite edges of said mounting plate 14. A caster wheel 19 is rotatably supported upon, and between, the flanges 16 and 17 by means of the wheel shaft 21. The mounting plate 14 has a circular opening 18 (Figure 3), and the flanges 16 and 17 are arranged with respect thereto so that the shaft 21 and the major portions of said flanges are both on the same side of the central axis of the opening 18, in order to produce a characteristic castering action in the wheel 19. A portion 22 of the mounting plate 14, immediately adjacent to the circular opening 18 therein, may be raised upwardly, but such is not essential to the invention.

The swivel pin 12 (Figure 2), prior to assembly thereof in a finished caster 10, has the form of a solid, substantially cylindrical rod, as indicated at 12a in Figure 3, having an annular integral flange 23 spaced from both ends thereof. The lower end 24 of the rod 12a is substantially smaller in diameter than the circular opening 18 in the mounting plate 14.

The swivel assembly 13 (Figures 2 and 3) includes upper and lower annular bearing ball retainers 26 and 27, respectively, which are preferably but not necessarily, substantially identical. Said ball retainers 26 and 27 have circular co-axial openings 28 and 29 through which the lower end 24 of the rod 12a is slidably and snugly receivable. Said ball retainers 26 and 27 also have annular flanges 31 and 32 disposed along outer edges thereof. The central portions 33 and 34 of the ball retainers 26 and 27, respectively, adjacent to the openings 28 and 29, are offset in the same direction as their respective flanges 31 and 32 whereby the central portions 33 and 34 cooperate with the flanges 31 and 32 to provide the annular recesses 36 and 37.

The flanges 31 and 32 have arcuate inner surfaces 38 and 39 adjacent to the bottoms of the recesses 36 and 37, respectively. The radii of curvature of said arcuate surfaces are substantially equal to the radii of the bearing balls 41 and 42, which are retained in the recesses 36 and 37. Thus, said arcuate surfaces 38 and 39 embrace the bearing balls 41 and 42, respectively, through an arc of up to approximately 90 degrees where, as here, the recesses 36 and 37 are substantially perpendicular to the remainders of said retainer rings. The flanges 31 and 32 preferably extend away from the bottoms of recesses 36 and 37, respectively, a distance slightly greater than the diameter of the corresponding associated bearing balls 41 and 42.

A pair of thrust or inner rings 43 and 44 (Figures 2 and 3) are disposed adjacent to, and co-axial with, the ball retainers 26 and 27, respectively. Said thrust rings have central openings 46 and 47, which are substantially larger than the diameter of the lower end 24 of the swivel rod 12a. The peripheries of said thrust rings 43 and 44 have annular grooves 48 and 49, respectively, the radial cross-sections of which are arcuate and have the same radius of curvature as the arcuate surfaces 38 and 39, respectively, on the corresponding retainer rings 26 and 27. The annular grooves 48 and 49 are adjacent to the mutually remote axial end surfaces 51 and 52 of the thrust rings 43 and 44, respectively. The mutually adjacent end surfaces 53 and 54 are, in this particular embodiment, in snug contact with each other. Thus, said thrust rings are arranged so that the grooves 48 and 49 will engage the surfaces of the bearing balls 41 and 42, respectively, along an arc of about 90 degrees on such ball surfaces at the same time that the diametrally opposite 90 degree arc of said ball surface is being engaged by said arcuate surfaces 38 and 39.

Annular notches 56 and 57 are provided in the peripheral surface of the thrust rings 43 and 44 at the mutually adjacent end surfaces 53 and 54 so that, when said end surfaces 53 and 54 are in contact with each other, as shown in Figure 2, said notches 56 and 57 combine to form an annular groove 58. The annular groove 58 is substantially equal in inside diameter to the diameter of the circular opening 18 in the mounting plate 14 and said groove 58 is only enough wider than the thickness of the said mounting plate 14 to receive said plate within the groove 58. The thrust rings 43 and 44 are provided with annular ridges 61 and 62, respectively, which are spaced a slight distance from the annular notches 56 and 57, respectively, to form the shoulders 61a and 62a.

A pair of flat and resilient sealing rings 63 and 64 (Figures 2 and 3) may encircle the thrust rings 43 and 44, respectively, between the ridges 61 and 62, and the groove 58. The normal inside diameter of each of the sealing rings 63 and 64 is somewhat smaller than the diameter of the respective shoulders 61a and 62a. Thus, since the peripheral portions of the sealing rings 63 and 64 will tend to retain their normal size and shape when the radially inner portions are stretched around the said shoulders of the thrust rings, said outer portions will tend to move axially out of radial alignment with the inner portions of said rings. Said sealing rings 63 and 64 are of such external diameter that they will, as a result of such axial movement, engage the free edges of the flanges 31 and 32. The sealing rings 63 and 64 are preferably fabricated from a flexible, resilient material, such as Buna-N, a synthetic plastic, rubber or a silicone, by way of example.

The sealing rings cooperate with the retainer and thrust rings to provide a substantially dust-tight and lubricant retaining housing for the bearing balls 41 and 42 and the bearing surfaces engaged thereby. However, where dust and dirt are not a problem or this problem is not of material importance, the sealing rings can be omitted, and the remaining advantages of the improved swivel structure will still be effectively met.

Lubrication holes 66 and 67 (Figure 3) are provided in the upper and lower ball retainers 26 and 27, respectively. Such holes are spaced radially inwardly from the path of engagement between said ball retainers and their respective bearing balls.

Assembly

In assembling the swivel caster 10 the upper bearing ball retainer ring 26 is placed upon the lower end 24 of the swivel rod 12a (Figure 3), so that the ring 26 is against the lower side of the flange 23 on said rod 12a as shown by broken lines at 26a with the flange 31 of the retainer ring 26 extending away from the flange 23. A controlled force is then applied to the lower end 24 of the rod 12a by a conventional forging process to form the enlargement, shown by broken lines at 71 in Figure 3, which holds the retainer ring 26 snugly against the flange 23. The forging operation, which creates the enlargement 71, is carefully controlled so that the lower edge 72 of the enlargement 71 is at a preselected distance from the lower surface of the upper retainer ring 26. Bearing balls 41 are now placed in the annular recess 36 after which a thrust ring 43 is placed around the enlarged portion 71 of the partially formed swivel pin 12, adjacent to the retainer ring 26 so that said bearing balls 41 are disposed between, and in engagement with, the arcuate surface 38 between the flange 31 and the bottom of the annular groove 48. Ordinarily, the assembly of the retainer ring 26 bearing ball 41 and thrust ring 43 will be accomplished with the swivel pin 12 in an inverted position so that gravity will hold the various parts in their relative positions and with respect to the flange 23. The lower retainer ring 27, the bearing balls 42 and the thrust ring 44 are assembled separately, in a manner substantially similar to that described above with respect to the rings 26 and 43 and the balls 41. The mounting plate 14 is now placed against the thrust ring 44 so that the notch 57 therein cooperates with the edge of the opening 18 in said plate 14. The two bearing assemblies are then brought together so that the end surfaces 53 and 54 of thrust rings 43 and 44 are snugly in contact with each other and the mounting plate is disposed in the groove 58.

The retainer ring 27 will bear firmly against the lower edge 72 (Figure 3) of the enlargement 71 and thereby provide an accurate, preselectable spacing between the two retainer rings. This spacing will be such that proper bearing tolerances will be automatically provided in the swivel assembly disposed between, and including, said retainer rings.

The lower end of the partially formed swivel pin 12 is now upset by applying a controlled pressure to said lower end to provide the flange 73 which holds the lower retainer ring 27 snugly against the enlargement 71, as shown in Figure 2.

It will be recognized from the foregoing description that the parts comprising the described bearing assembly can be formed and assembled with extreme accuracy, so that the tolerances of the assembled bearing structure can be held to a minimum. Particularly, the forming operations resulting in the retainer rings 26 and 27 will be accurate and can maintain very small tolerances, and the forming operations, resulting in the thrust rings 43 and 44 will be similarly closely controllable. The forging operation compressing the lower end 24 of the rod 12a to form the enlarged portion 71 can be equally closely and accurately controlled. Therefore, when the parts are assembled, the resulting structure will snugly and evenly engage the several bearing balls to form a strong, uniform and smoothly operating device.

The upper sealing ring 63 is moved downwardly over the upper end of the swivel pin 12 and is then stretched so that it will pass over the upper retainer ring 26 into position around the thrust ring 43. The resilience of the sealing ring 63 will cause its inner edge to snugly embrace the shoulder 61a of the thrust ring 43. The forces created in the sealing ring 63 by its resilient engagement with the thrust ring 43, distort said ring 63, which causes the outer peripheral portion of the sealing ring to move in one axial direction or the other. The mounting plate 14 tends to urge movement of the sealing ring 63 upwardly so that it will engage the free edge of the flange 31, thereby providing a dustproof seal between the thrust ring 43 and the retaining ring 26. Accordingly, as the retainer ring 26 pivots with respect to the thrust ring 43, the sealing ring 63 will slide along the flange 31. If the ring 63 must be replaced after the swivel pin 12 has been secured to a relatively large object, the sealing ring 63 can be brought up over the caster wheel 19 and the support frame 11 into position between the retainer ring and the mounting plate 14.

In a similar manner, the sealing ring 64 is stretched around and moved over the lower retainer ring 27 and placed in position around the shoulder 62a of the thrust ring 44 between the ridge 62 and the lower surface of the mounting plate 14. The stretching of the inner portion of the sealing ring 64 will distort said ring, thereby causing its peripheral portion to engage the free edge of the flange 32, thereby providing the seal between the thrust ring 44 and the retainer ring 27. The caster wheel 19 may be mounted upon the support frame 11 before or after the assembly of the swivel assembly 13 as desired. The swivel assembly 13 is now ready for operation.

Operation

The swivel caster 10 will normally be connected to the load which it supports by means of the swivel pin 12 in a substantially conventional manner. Due to the sideward displacement of the wheel shaft 21 with respect to the pivotal axis of the swivel pin 12, a bending moment will be produced between the support frame 11 and swivel pin 12. Such moment will cause the mounting plate 14 to be urged upwardly against the thrust ring 43 on the wheel side of the frame, which is the leftward side as appearing in Figure 2. Accordingly said bending moment will cause said plate 14 to be urged downwardly against the thrust ring 44 on the opposite side of the frame. This racking action will tend to prevent relative rotation of the thrust rings 43 and 44 with respect to the mounting plate 14. However, since the thrust rings 43 and 44 are relatively hard forgings and the stamped retainer rings 26 and 27 are hardened, a said bending moment produced by any normal load, which the caster 10 is designed to support, will not materially reduce the effectiveness of the swivel assembly 13.

The sealing rings 63 and 64, being stretched around the thrust rings 43 and 44 tend to remain stationary with respect thereto. Thus, as the support frame 11 is pivoted by means of the swivel assembly 13 with respect to the swivel pin 12, the peripheral portions of said sealing rings will slidably and sealingly engage the free edges, respectively, of the flanges 31 and 32, whereby a dust-tight and grease retaining construction is provided. The bearing surfaces within the swivel assembly 13 can be easily lubricated simply by moving the peripheral portions of the sealing rings 63 and 64 away from the flanges 36 and 37, and passing the lubricant therebetween. Alternatively, the lubricant can be applied through the openings 66 and 67 (Figure 3) in the upper and lower ball retainers 26 and 27, respectively.

In the modified structure 79 (Figure 4), a king pin 80 is used in place of the swivel pin 12 of Figure 2 to mount the swivel caster upon a plate structure 81. In such case the plate 81 is provided with a circular opening 82, which has substantially the same diameter as the circular opening 28a in the upper retainer ring 26b. In the fabrication of the modified structure 79, the king pin 80 is preferably provided with a central enlarged portion 83 prior to assembly. Thus, the plate 81 and upper retainer ring 26b are placed on the upper end 84 of the king pin 80, after which such upper end is upset by forging process to provide a flange 86, which holds the plate 81 and upper retainer ring 26b snugly against each other and against the enlarged portion 83. The upsetting operation creating the flange 86 may be accomplished at the same time that the upsetting operation is conducted to provide the flange 73, as shown in Figure 2, at the lower end of the swivel assembly 13. In all other respects, the modified structure 79, shown in Figure 4, may be identical with the structure shown in Figures 1 to 3, inclusive.

It will be appreciated that, with the construction here described, the only parts which will need to be hardened will be the retainer rings 26 and 27 and the thrust rings 43 and 44. All of the remaining parts may be made of unhardened steel, or other suitable material, with resultant savings in the cost of manufacture of the device.

It will be further appreciated that, with the retainer rings 26 and 27 identical with respect to each other and with the thrust rings 43 and 44 identical with respect to each other, the number of different parts required to assemble the swivel structure of the present invention is kept at a minimum and the manufacturer's inventory control is thereby materially facilitated.

Where it is desired to vary the thickness of the plate 14, this can be readily done merely by inserting a suitable spacer between the respective thrust rings 43 and 44. Thus, one particular size and design of retainer rings and thrust rings can be utilized with a substantial variety of different sizes and designs of supporting frame 11, without change in the size, design or other characteristics of the remainder of the swivel structure. This further minimizes the number of different parts required and further facilitates manufacturing inventory control.

Although particular preferred embodiments of the invention have been disclosed hereinabove for illustrative purposes, it will be understood that variations or modifications in such disclosure, which lie within the scope of the appended claims, are fully contemplated.

I claim:

1. In a swivel mechanism for a swivel caster having a mounting plate, said swivel mechanism including a pair of flanged bearing ball retainer rings on opposite sides of, and spaced from, said mounting plate, a pair of thrust rings disposed between said retainer rings and on opposite sides of said mounting plate, the flange of each of said retainer rings encircling and being radially spaced from the adjacent thrust ring, and a plurality of bearing balls disposed between each retainer ring and adjacent thrust ring, the combination comprising: a pair of flexible, expansible and resilient sealing rings having inside diameters normally smaller than the outside diameters of said thrust rings, said sealing rings being substantially flat in their unstressed condition and being expanded and sleeved over said thrust rings so that the inner portions of said sealing rings snugly but releasably engage said thrust rings adjacent to said mounting plate; means on said thrust rings holding the radially inner portions of said sealing rings against axial movement away from said mounting plate, the engagement of each thrust ring by the inner portion of each sealing ring effecting an axial deflection of the peripheral portion of said sealing ring, toward the flange of the adjacent retainer ring, said peripheral portion being in sealing engagement with the adjacent retainer ring radially outwardly of said bearing balls.

2. A swivel caster construction, comprising: a swivel pin; ring means defining a pair of oppositely facing thrust surfaces, said ring means having a central opening through which said swivel pin extends, said swivel pin being radially spaced from the wall of said ring means defining said central opening; said ring means having a groove formed in the periphery thereof between the axial ends thereof; said ring means having annular, axially arcuate, peripheral thrust surfaces at the opposite axial ends thereof, said thrust surfaces being curved through an arc of about 90 degrees and facing outwardly with respect to said pin and away from each other in opposite axial directions; a wheel supporting frame having a mounting plate with a central opening therethrough, said mounting plate being received within said groove so that said ring means extends through the central opening thereof, said ring means being secured to said mounting plate; a pair of annular, substantially cup-shaped plates secured to said swivel pin at axially spaced points thereon adjacent the respective axial ends of said ring means and facing each other; said cup-shaped plates each having a radially outer, curved portion located outwardly from and opposed to the thrust surface adjacent thereto; and facing said swivel pin, said curved portions being curved through an arc of about 90 degrees said cup-shaped plates having a cylindrical flange merged with each of said curved portions and extending therefrom toward said mounting plate; and a set of bearing balls positioned between each thrust surface and the curved portion opposed thereto.

3. A swivel caster construction, comprising: an elongated swivel pin; a pair of coaxial, abutting, identical thrust rings surrounding and radially spaced from said pin, said rings having mating annular notches in the periphery of the abutting surfaces thereof defining a peripheral groove, said rings each having annular, axially arcuate, thrust surfaces on the periphery thereof adjacent the remote ends thereof, said thrust surfaces facing outwardly with respect to said swivel pin and away from each other in opposite axial directions; a pair of identical, annular, cup-shaped plates secured to said swivel pin above and below said thrust surfaces, respectively; said cup-shaped plates facing each other and each having a radially outer, axially curved, annular portion located outwardly from and opposed to and spaced from the adjacent thrust surface and facing said swivel pin, each of said portions having a cylindrical flange merged with said curved portion and extending therefrom toward the corresponding flange on the other cup-shaped plate, the opposed ends of said flanges being axially spaced from each other; a wheel supporting frame having a mounting plate with a central opening, said mounting plate being of slightly lesser axial thickness than said groove and said central opening being of slightly greater diameter than said groove, said mounting plate extending between the opposed ends of said flanges and being received in said groove and secured to said rings; and a set of bearing ball positioned between each thrust surface and the curved portion opposed thereto.

4. A swivel caster construction according to claim 3 including a pair of similar, resilient, sealing rings positioned, respectively, above and below said mounting plate, the inner edge of said sealing rings being in sealing engagement with the peripheries of the thrust rings, respectively; the outer edges of said sealing rings being in sealing engagement with the flanges of said cup-shaped plates, respectively, and being slidable with respect thereto.

5. A swivel caster construction, comprising: an elongated swivel pin; a pair of coaxial, abutting identical thrust rings surrounding and radially spaced from said pin, said rings having mating, annular notches in the periphery of the abutting surfaces thereof defining a peripheral groove, said rings each having an annular, radially outwardly extending ridge on the periphery thereof and spaced axially from the notch thereof to define a recess between said ridge and said notch, said rings each having annular, axially arcuate, thrust surfaces on the periphery thereof adjacent the remote ends thereof, said thrust surfaces being curved through an arc of about 90 degrees and facing outwardly with respect to said swivel pin and away from each other in opposite axial directions; a pair of identical, annular, cup-shaped plates secured to said swivel pin above and below said thrust surfaces, respectively, said cup-shaped plates facing each other and each having a radially outer, axially curved, annular portion opposed to and spaced from the adjacent thrust surface, said curved portion being curved through an arc of about 90 degrees, each of said cup-shaped plates having a cylindrical flange merged with said curved portion and extending toward the corresponding flange on the other cup-shaped plate, the opposed ends of said flanges being axially spaced from each other; a wheel supporting frame having a mounting plate with a central opening, said mounting plate being of slightly lesser axial thickness than said groove and said central opening being of slightly greater diameter than said groove, said mounting plate extending between the opposed ends of said flanges and being received in said groove and secured to said rings; a set of bearing balls positioned between each thrust surface and the curved portion opposed thereto; an annular, expansible, resilient sealing ring having an inner edge received within the recess of each of said thrust rings, the internal diameter of said ring being slightly less than the diameter of said recess so that said ring is distorted away from said mounting plate toward the flange of the adjacent cup-shaped plate, the peripheral portion of said ring resiliently bearing against the end of the flange on the cup-shaped plate associated therewith.

References Cited in the file of this patent

UNITED STATES PATENTS

| | | |
|---|---|---|
| 1,629,650 | Brauer | May 24, 1927 |
| 1,636,326 | Roe | July 19, 1927 |
| 1,734,363 | Chesnutt | Nov. 5, 1929 |
| 2,009,281 | Stein | July 23, 1955 |
| 2,617,668 | Stewart | Nov. 11, 1952 |
| 2,787,804 | Noelting et al. | Apr. 9, 1957 |
| 2,823,553 | Harrington | Feb. 18, 1958 |

FOREIGN PATENTS

| | | |
|---|---|---|
| 21,920 | Great Britain | Sept. 21, 1910 |